(12) United States Patent
Wu et al.

(10) Patent No.: US 9,990,142 B2
(45) Date of Patent: Jun. 5, 2018

(54) MASS STORAGE SYSTEM AND METHOD OF STORING MASS DATA

(71) Applicant: FREESCALE SEMICONDUCTOR, INC., Austin, TX (US)

(72) Inventors: Shuwei Wu, Tianjin (CN); Bin Feng, Tianjin (CN); Bin Sai, Tianjin (CN)

(73) Assignee: NXP USA, INC., Austin, TX (US)

( * ) Notice: Subject to any disclaimer, the term of this patent is extended or adjusted under 35 U.S.C. 154(b) by 110 days.

(21) Appl. No.: 15/256,594

(22) Filed: Sep. 4, 2016

(65) Prior Publication Data

US 2017/0357455 A1 Dec. 14, 2017

(30) Foreign Application Priority Data

Jun. 13, 2016 (CN) .......................... 2016 1 0412658

(51) Int. Cl.
*G06F 3/06* (2006.01)
*G06F 12/0868* (2016.01)

(52) U.S. Cl.
CPC .......... *G06F 3/0611* (2013.01); *G06F 3/0643* (2013.01); *G06F 3/0656* (2013.01); *G06F 3/0658* (2013.01); *G06F 3/0673* (2013.01); *G06F 12/0868* (2013.01)

(58) Field of Classification Search
CPC .... G06F 3/0611; G06F 3/0643; G06F 3/0656; G06F 3/0658; G06F 3/0673; G06F 12/0804; G06F 2212/1024
See application file for complete search history.

(56) References Cited

U.S. PATENT DOCUMENTS

| 8,285,932 | B2 | 10/2012 | Abeling et al. |
| 8,984,220 | B1 | 3/2015 | Gill et al. |
| 9,069,797 | B1 | 6/2015 | Aliev et al. |
| 2010/0293337 | A1* | 11/2010 | Murphy .............. G06F 12/0866 711/136 |
| 2012/0284587 | A1* | 11/2012 | Yu ......................... G06F 3/0608 714/773 |

* cited by examiner

*Primary Examiner* — Larry T Mackall
(74) *Attorney, Agent, or Firm* — Charles E. Bergere

(57) ABSTRACT

A mass storage system for storing mass data generated by a mass data source. The system includes a data buffer coupled to the mass data source, and a file system and command generator. The data buffer caches the mass data. The file system and command generator generates file system data corresponding to the mass data stored in the data buffer. The file system and command generator also automatically configures a SATA host controller so that the SATA host controller will move the cached mass data and the generated file system data to a mass storage device.

6 Claims, 4 Drawing Sheets

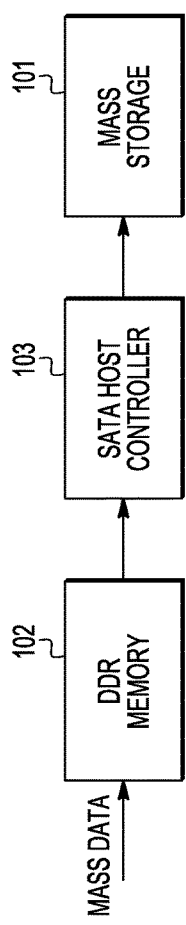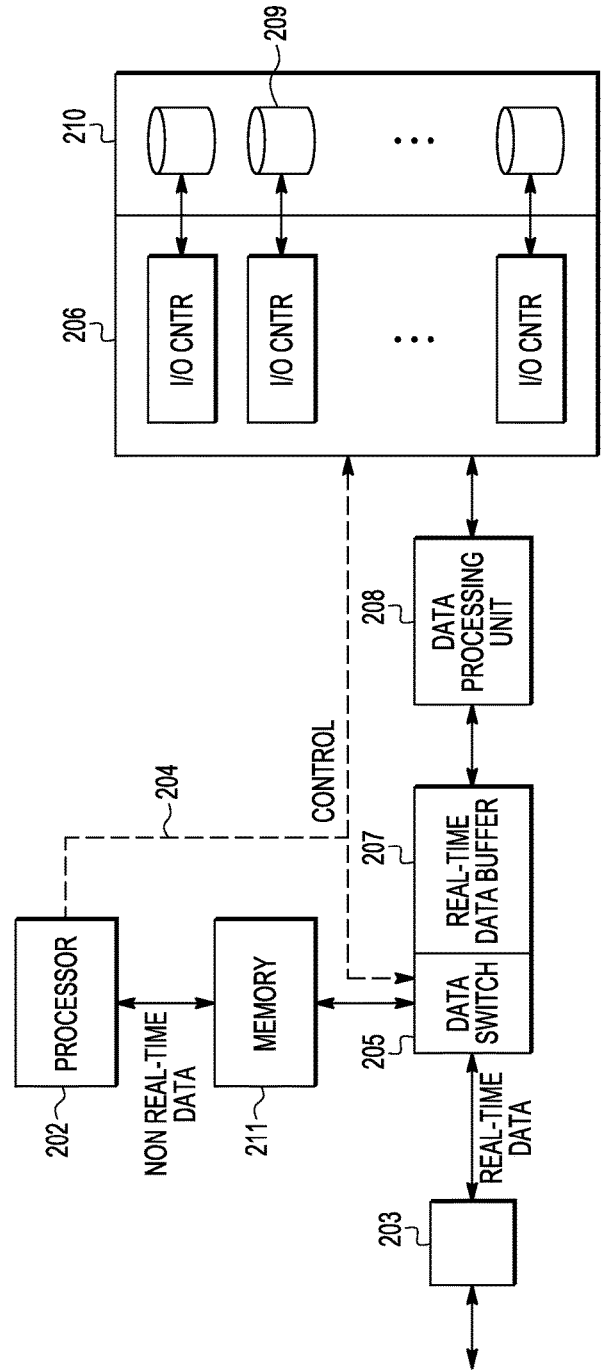

MASS STORAGE SYSTEM AND METHOD OF STORING MASS DATA

BACKGROUND

The present application is generally directed to a system for storing mass data, and more particularly to a system for caching mass data by a data buffer and generating file system data by a file system and command generator module.

Sometimes, mass data such as video data must be saved to mass storage such as to a solid-state disk (SSD) drive. In such case, saving the data will consume a lot of system data bandwidth and affect system performance.

FIG. 1 depicts a conventional mass storage system 100. In the traditional mass storage system 100, to store mass data to mass storage 101, the data first is saved in a DDR (double-data rate) memory 102, which acts as a data buffer. Next, the SATA (Serial AT Attachment) host controller 103 is configured and then the SATA host controller 103 moves the data from the DDR memory 102 to the mass storage 101. The mass storage 101 may be a SSD hard disk and the data may be stored using a direct memory access (DMA). These processes consume DDR memory bandwidth and sometimes an interrupt processor too. For example, in the case of video data, where video data is saved to mass storage, the mass data occupies much of the DDR memory's bandwidth. If another module such as a General Purpose Unit (GPU) wants to use the DDR memory 102 as a buffer at the same time that the DDR memory 102 is being used to save the video data to the mass storage 101, there may be a degradation of the system performance.

FIG. 2 depicts a mass storage system 200 with an embedded processor 202 for managing real-time data streams. A real-time interface block 203 is connected to a real-time data source (like a camera). The embedded processor 202 configures I/O control units 206 and a mass storage array 210 to be in a requested mode using control connections 204. For example, for real-time streaming, the embedded processor 202 first configures the I/O control units 206 and the mass storage array 210. A data switch 205 selects the real-time interface block 203 for data streaming. In addition, the I/O control units 206 receive information about the direction and the storage address of the data in the real-time data stream. In the case of a 'record' user input, the real-time data stream passes through the real-time interface block 203, the data switch 205, a real-time data buffer 207, and a data processing unit 208. The data processing unit 208 splits the real-time data stream and sends the real-time data to the I/O control units 206 and the I/O control units 206 write the data to a plurality of storage units 209 of the mass storage array 210. Thus, in this scenario, the processor 202 has to configure a SATA host controller and generate file system information, which may adversely impact the system performance.

Therefore, it would be advantageous to have a mass storage system that can store mass data with high system performance.

SUMMARY

This summary is provided to introduce a selection of concepts in a simplified form that are further described below in the Detailed Description. This summary is not intended to be relied on to identify key features or essential features of the claimed subject matter, nor is it intended to be used to limit the scope of the claimed subject matter.

The present invention provides a mass storage system connected to a mass data source that generates mass data. The system comprising a data buffer configured to cache the mass data, a file system and command generator configured to generate file system data and send the generated file system data to the data buffer, a SATA host controller coupled to the data buffer for receiving the cached mass data, and to the file system and command generator; and a mass storage device coupled to the SATA host controller. The file system and command generator device instructs the SATA host controller to moves the mass data cached in the data buffer and the generated file system data to the mass storage device.

The present invention also provides a method of storing mass data generated by a mass data source in a mass storage device. The method comprising caching the mass data in a first data buffer coupled to the mass data source; initializing a SATA host controller by a file system and command generator device; generating file system data by the file system and command generator device and storing the generated file system data in the first buffer; moving the cached mass data from the first data buffer to a mass storage device, wherein the file system and command generator device instructs the SATA host controller to get the cached data and the generated file system data from the first data buffer; and moving the generated file system data to the mass storage device by the SATA host controller.

BRIEF DESCRIPTION OF THE DRAWINGS

So that the manner in which the above recited features of the present application can be understood in detail, a more particular description of the application, briefly summarized above, may be had by reference to embodiments, some of which are illustrated in the appended drawings. It is to be noted, however, that the appended drawings illustrate only typical embodiments of this application and are therefore not to be considered limiting of its scope, for the application may admit to other equally effective embodiments. The drawings are for facilitating an understanding of the application and thus are not necessarily drawn to scale. Advantages of the subject matter claimed will become apparent to those skilled in the art upon reading this description in conjunction with the accompanying drawings, in which like reference numerals have been used to designate like elements, and in which:

FIG. 1 is a schematic block diagram of a conventional mass storage system;

FIG. 2 is a schematic block diagram of another conventional mass storage system;

DETAILED DESCRIPTION

Figure 3:
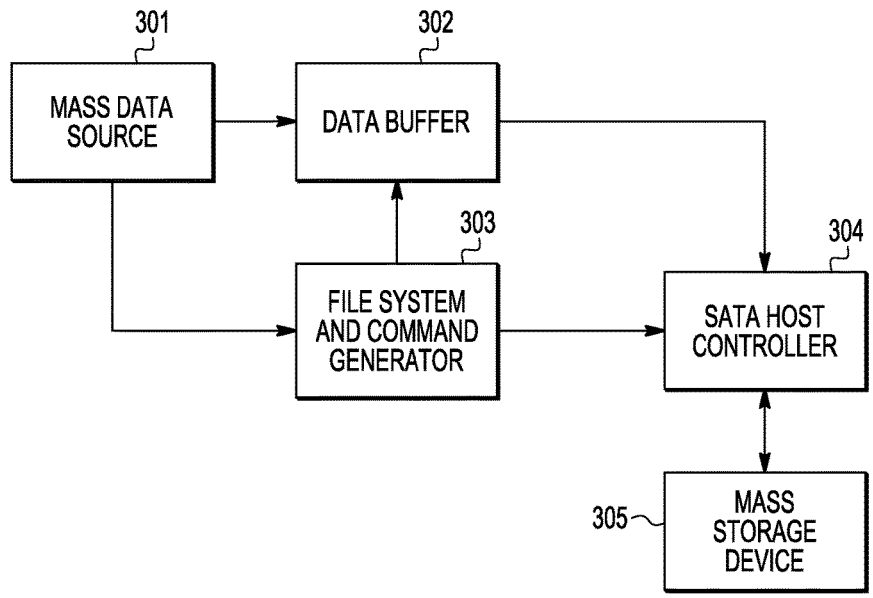
FIG. 3 is a schematic block diagram of a mass storage system in accordance with an exemplary embodiment of the present application.

Referring now to the FIG. 3, a mass storage system 300 in accordance with an exemplary embodiment of the present application is shown. The mass storage system 300 is coupled to a mass data source 301, which generates and provides mass data to the system 300. The mass data source 301 may comprise, for example, a camera sensor. A data buffer 302 is coupled to the mass data source 301 and caches the mass data therefrom. The data buffer 302 may cache the mass data by way of a data bus and related clock. Each time the data buffer 302 may cache one frame of the mass data and the mass data does not have to have any particular format. The data buffer 302 may comprise, for example, a simple dual port RAM with a capacity of up to 2 MB. A file system and command generator 303 is connected to the data buffer 302 and is configured to generate file system data and send the generated file system data to the data buffer 302. The data buffer 302 and the file system and command generator 303 also are both connected to a SATA host controller 304. The SATA host controller 304 is coupled to a data storage device 305. The SATA host controller 304 is configured to move the mass data and the generated file system data from the data buffer 302 to the mass storage device 305. The generated file system data corresponds to the mass data stored in the mass storage device 305. In one embodiment, the mass storage device 305 is a hard disk.

The file system and command generator 303 comprises a plurality of logic gates that implement a state machine for generating the file system data. The file system format may be, for example, FAT32 and a command may be an ATA-ATAPI command. The generation of file system data is known by those of skill in the art so a detailed description thereof is not provided herein.

In one embodiment, the file system and command generator 303 generates file system data and sends the file system data to the data buffer 302, and configures the SATA host controller 304. In such case, mass data is saved in the mass storage device 305 without interrupting processor. In one embodiment, the file system data is generated by the file system and command generator 303 after one or more frames of the mass data are stored in the mass storage device 305. In another embodiment, the file system data is generated before the one or more frames of mass data are stored in the mass storage device 305 and can be modified when the corresponding mass data is stored in the mass storage device 305. In another embodiment, file system and command generator 303 generates the file system data when it does not configure the SATA host controller 304. In this way, file system and command generator 303 can be more efficient. In yet another embodiment, the file system and command generator 303 is connected to the mass data source 301. The file system and command generator 303 configures the SATA host controller to move the mass data from data buffer 302 to the mass storage device 305 when the file system and command generator device 303 receives a signal from the mass data source 301 which indicates the mass data has been cached by the data buffer 302.

Figure 4:
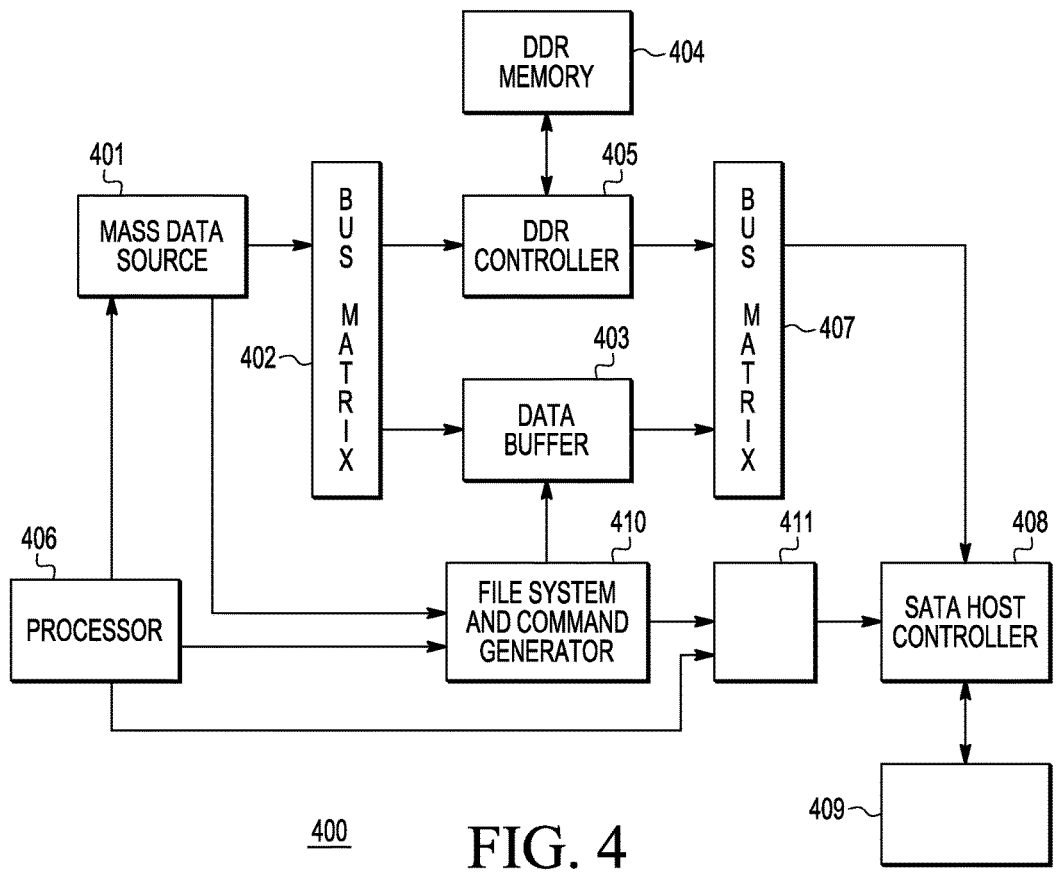
FIG. 4 is a schematic block diagram of a mass storage system in accordance with another exemplary embodiment of the present application.

Referring to FIG. 4, a mass storage system 400 in accordance with another exemplary embodiment of the present application is shown. The mass storage system 400 is coupled to a mass data source 401, which generates and provides mass data to the system 400. The mass data source 401 may comprise, for example, a camera sensor. The mass storage system 400 further includes a first bus matrix 402. A data buffer 403 and a DDR memory 404 are coupled to the mass data source 401 by way of the first bus matrix 402. The DDR memory 404 is coupled to the first bus matrix 402 by way of a DDR controller 405. The mass data source 401 preferably is configured to select one of the data buffer 403 and the DDR memory 404 to cache the mass data by way of the first bus matrix 402 depending on a bandwidth of the DDR memory 404 by a processor 406. That is, the processor 406 is connected to the mass data source 401 and provides a signal to the mass data source 401 about where the mass data should be cached, either in the buffer 403 or the DDR memory 404. The processor 406 may comprise ARM core processor. The processor 406 configures the mass data source to send the mass data to DDR memory 404 or data buffer 403 with cache address according to a system application being executed by the processor.

The mass storage system 400 further includes a second bus matrix 407 coupled between the data buffer 403 and the DDR memory 404, and a SATA host controller 408. The SATA host controller 408 moves data output from one of the DDR memory 404 and the data buffer 403 by way of the second bus matrix 407 to a mass data storage device 409. The mass data storage 409 may comprise a hard disk. SATA host controllers and hard disk devices are known by those of skill in the art so detailed descriptions of these two elements of the system 400 will not be further described.

If the DDR memory 404 does not have enough bandwidth to cache the mass data stored in the mass data source 401, the processor 406 can configure the mass data source 401 to select the data buffer 403 to cache the mass data. In such case, the mass data source 401 provides a signal to a file system and command generator 410. The signal indicates that the mass data has been cached in the data buffer 403. The file system and command generator 410 is enabled by the processor 406 and configured to generate file system data and send the generated file system data to the data buffer 403. The file system and command generator also configures the SATA host controller 408 so that the SATA host controller 408 moves the mass data and the generated file system data from the data buffer to the mass storage device 408. The generated file system data corresponds to the mass data stored in the mass storage device 409. In one embodiment, the file system data is generated after the mass data is stored in the mass storage device 409, and in another embodiment, the file system data is generated before the mass data is stored in the mass storage device 409 and can be modified when the mass data is stored in the mass storage device 409. In another embodiment, the file system data is generated when some of the corresponding mass data is stored in the mass storage device 409 and modified when all the corresponding mass data is stored in the mass storage device 409. If the DDR memory 404 has enough bandwidth to cache the mass data generated by the mass data source 401, then the processor 406 configures the mass data source 401 to select the DDR memory 404 to cache the mass data. In this case, the data buffer 403 and the file system and command generator 404 may be disabled by the processor 406.

The SATA host controller 408 is configured to move the data from the DDR memory 404 to the mass storage device 409 by the processor 406. A selector 411 may be connected between the file system and command generator 410 and the processor 406, and the SATA host controller 408, as shown in FIG. 4. The SATA host controller 408 may be configured by the file system and command generator 410 or the processor 406 by way of the selector 411. In one embodiment, the selector 411 is part of the file system and command generator 410.

It will be understood that the mass storage system 400 can be used not only in SOC chip architecture, but also in any architecture that is used to store mass data. The first bus matrix 402 and the second bus matrix 407 can be replaced by other path selectors known in the art.

Figure 5:
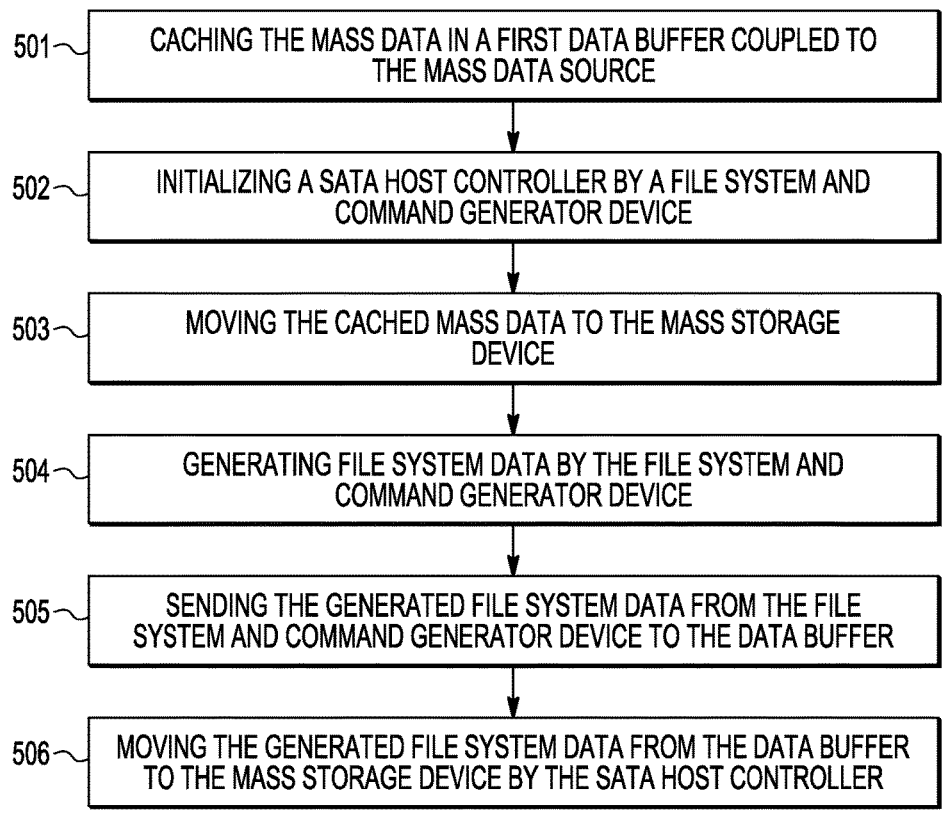
FIG. 5 is a flow chart of a method of storing mass data in accordance with an exemplary embodiment of the present application.

Returning to FIG. 5, a flow chart of a method of storing mass data generated by a mass data source in accordance with an exemplary embodiment of the present application is shown. Step 501 begins with caching the mass data in a first data buffer coupled to the mass data source. In step 502, a SATA host controller is initialized by a file system and command generator device. Then in step 503, the cached mass data is moved to the mass storage device. The file system and command generator device instructs the SATA host controller to get the cached data from the first data buffer. Then in step 504, file system data corresponding to the mass data stored in the mass storage device is generated by the file system and command generator device. Next in step 505, the generated file system data is sent from the file system and command generator device to the data buffer. Finally in step 506, the generated file system data is moved to the mass storage device by the SATA host controller.

Figure 6:
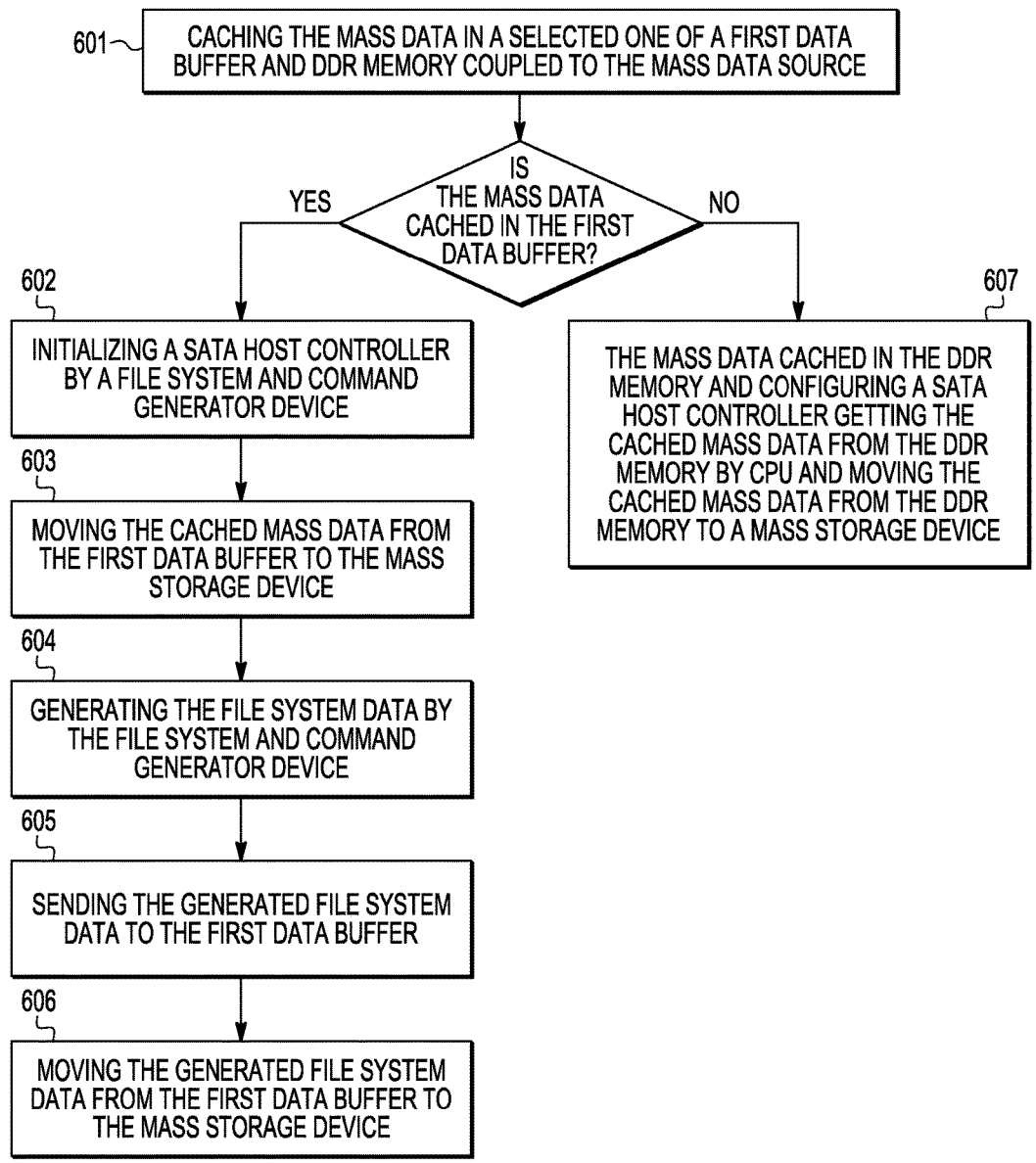
FIG. 6 is flow chart of another method of storing mass data in accordance with an exemplary embodiment of the present application.

Referring to FIG. 6, a flow chart of another method of storing mass data generated by a mass data source in accordance with an exemplary embodiment of the present invention is shown. Step 601 begins with caching the mass data in a selected one of a first data buffer and a DDR memory coupled to the mass data source. The mass data source is configured to select between the first data buffer or the DDR memory to cache the mass data depending on the bandwidth of the DDR memory. The first data buffer or the DDR memory can cache the mass data by way of a first bus matrix. If the DDR memory does not have sufficient bandwidth to cache the mass data, the mass data source will cache the mass data in the first data buffer. Sufficient bandwidth means, for example, the DDR providing 800 MB/s bandwidth and GPU uses 500 MB/s bandwidth. The remaining DDR bandwidth is sufficient for running. But if another video mass data wants to use the DDR as a buffer, the DDR bandwidth may not be sufficient. Then in step 602, a SATA host controller is initialized by a file system and command generator device. And in step 603, the cached mass data is moved to the mass storage device. The file system and command generator device instructs the SATA host controller to get the cached data and generated file system data from the first data buffer when the mass data is stored in the first data buffer. Then in step 604 the file system data corresponding to the mass data stored in the mass storage device is generated by the file system and command generator device. Then in step 605, the generated file system data is sent to the first data buffer. Finally in step 606, the generated file system data is moved from the first data buffer to the mass storage device. If the mass data is cached in the DDR memory instead of in the first data buffer, step 607 is performed, where the SATA host controller is configured to move the cached mass data from the DDR memory to the mass storage device.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the application as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A mass storage system connected to a mass data source that generates mass data, the system comprising:
   a data buffer coupled to the mass data source, wherein the data buffer is configured to cache the mass data;
   a file system and command generator coupled to the data source and the data buffer, and configured to generate file system data and send the generated file system data to the data buffer;
   a SATA host controller coupled to the data buffer for receiving the cached mass data, and to the file system and command generator;
   a mass storage device coupled to the SATA host controller, wherein the file system and command generator device instructs the SATA host controller to move the mass data cached in the data buffer and the generated file system data to the mass storage device;
   a DDR memory coupled between the mass data source and the SATA host controller, wherein the mass data source is configured by a processor to select one of the DDR memory and the data buffer in which to cache the mass data, and wherein the SATA host controller receives output data from one of the DDR memory and the first data buffer;
   a first bus matrix coupled between the mass data source and the data buffer and the DDR memory; and
   a second bus matrix connected between the first data buffer and the DDR memory, and the SATA host controller, wherein the SATA host controller receives the output data from one of the DDR memory and the data buffer by way of the second bus matrix.

2. The system of claim 1, wherein the mass data source is a camera sensor.

3. The system of claim 1, wherein the file system and command generator generates the file system data when the file system and command generator is not used to configure the SATA host controller.

4. The system of claim 1, wherein file system and command generator configures the SATA host controller to move the mass data from data buffer to the mass storage device when the file system and command generator receives a signal from the mass data source that indicates the mass data has been cached by the data buffer.

5. A method of storing mass data generated by a mass data source in a mass storage device, the method comprising:
   caching the mass data in a selected one of a first data buffer and a DDR memory coupled to the mass data source;
   wherein when caching the mass data in the first data buffer, the method further comprises:
   initializing a SATA host controller by a file system and command generator device;
   generating file system data corresponding to the mass data by the file system and command generator device and storing the file system data in the first data buffer;
   moving the cached mass data to the mass storage device, wherein the file system and command generator device instructs the SATA host controller to get the cached data and the generated file system data from the first data buffer; and
   moving the generated file system data to the mass storage device by the SATA host controller,
   wherein caching the mass data is determined by the mass data source and depends on a bandwidth of the DDR memory.

6. The method of claim 5, wherein when the mass data is selected to be cached in the DDR memory, the method further comprises configuring the SATA host controller to get the cached mass data from the DDR memory and moving the cached mass data from the DDR memory to the mass storage device.

* * * * *